United States Patent
Han et al.

(10) Patent No.: US 8,487,917 B2
(45) Date of Patent: Jul. 16, 2013

(54) 2D/3D IMAGE DISPLAY DEVICE, ELECTRONIC IMAGE DISPLAY DEVICE, AND DRIVING METHOD THEREOF

(75) Inventors: Seong-Cheol Han, Uijeongbu-si (KR); Hui Nam, Yongin-si (KR); Hyoung-Wook Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1221 days.

(21) Appl. No.: 11/736,488

(22) Filed: Apr. 17, 2007

(65) Prior Publication Data
US 2007/0242068 A1   Oct. 18, 2007

(30) Foreign Application Priority Data

Apr. 17, 2006 (KR) .......... 10-2006-0034658
Feb. 27, 2007 (KR) .......... 10-2007-0019586

(51) Int. Cl.
*G06F 3/038* (2006.01)
*G09G 5/00* (2006.01)

(52) U.S. Cl.
USPC ............... 345/204; 348/42; 349/15; 359/462

(58) Field of Classification Search
USPC ........ 348/43, 51, 42, 44–50, 52–60; 353/7–9; 345/204; 349/15; 359/462–477
See application file for complete search history.

(56) References Cited

U.S. PATENT DOCUMENTS

| | | | |
|---|---|---|---|
| 5,945,965 A | 8/1999 | Inoguchi et al. | |
| 6,108,029 A * | 8/2000 | Lo ................................. | 348/43 |
| 2003/0011884 A1 | 1/2003 | Van Berkel | |
| 2004/0057612 A1 | 3/2004 | Tabata | |
| 2005/0102700 A1 * | 5/2005 | Cormack et al. ............. | 725/100 |
| 2005/0128584 A1 * | 6/2005 | Shulman et al. .............. | 359/462 |
| 2005/0212744 A1 | 9/2005 | Hada et al. | |
| 2007/0120807 A1 * | 5/2007 | Bai et al. ....................... | 345/102 |

FOREIGN PATENT DOCUMENTS

| | | |
|---|---|---|
| CN | 1526243 A | 9/2004 |
| EP | 0 751 690 A2 | 1/1997 |
| EP | 1 551 189 A1 | 7/2005 |
| JP | 09-015532 | 1/1997 |
| JP | 09-073049 | 3/1997 |
| JP | 09-138370 | 5/1997 |
| JP | 10-074267 | 3/1998 |
| JP | 10-142572 | 5/1998 |

OTHER PUBLICATIONS

European Search Report dated Sep. 28, 2007, for EP 07106317.6, in the name of Samsung SDI Co., Ltd.
Extended European Search Report dated Dec. 20, 2007, for European application 07106317.6.
European Search Report for corresponding European Application No. EP 09 15 1412, mailed on Mar. 24, 2009 and completed on Mar. 18, 2009.
Hyo Jin Lee, et al., "8.2: A High Resolution Autostereoscopic Display Employing a Time Division Parallax Barrier," *SID 06 Digest*, May 24, 2005, pp. 81-83, vol. XXXVII, Society for Information Display. [XP007012631][ISSN: 0006-966X].
Japanese Office Action in Corresponding Application Serial No. 2007-106230, dated Nov. 1, 2011, 2 pages.

* cited by examiner

*Primary Examiner* — Michael Pervan
(74) *Attorney, Agent, or Firm* — Christie, Parker & Hale, LLP

(57) ABSTRACT

A 2-dimensional (2D)/3-dimensional (3D) image display device generates 2D or 3D image data according to an input image signal and displays them on a display unit. The display unit includes a display panel for displaying an image in response to the 2D or 3D image data and an optical element layer operative during first and second driving modes in accordance with the 3D and 2D image data. A controller converts the optical element layer to be in the first driving mode in a first period before a 3D image signal is displayed when the input image signal changes from a 2D image signal to the 3D image signal, and converts the optical element layer to be in the second driving mode in a second period after the 2D image signal is displayed when the input image signal changes from the 3D image signal to the 2D image signal.

35 Claims, 10 Drawing Sheets

2D/3D IMAGE DISPLAY DEVICE, ELECTRONIC IMAGE DISPLAY DEVICE, AND DRIVING METHOD THEREOF

CROSS-REFERENCE TO RELATED APPLICATIONS

This application claims priority to and the benefit of Korean Patent Application No. 10-2006-0034658 filed in the Korean Intellectual Property Office on Apr. 17, 2006, and Korean Patent Application No. 10-2007-0019586 filed in the Korean Intellectual Property Office on Feb. 27, 2007, the entire contents of both of which are incorporated herein by reference.

BACKGROUND OF THE INVENTION

1. Field of the Invention

The present invention relates to an electronic image display device. More particularly, the present invention relates to an electronic image display device for generating data according to input 2-dimensional (2D) or 3-dimensional (3D) image signals and displaying 2D or 3D images, and a driving method thereof.

2. Description of the Related Art

Generally, people perceive a stereoscopic effect physiologically and experientially. In three-dimensional image display technology, a stereoscopic effect of an object is produced by using binocular parallax, which is a primary factor in recognizing a stereoscopic effect at a short distance.

Typically, a stereoscopic image display device uses a method using optical elements to spatially divide left and right images to display a stereoscopic image. Typical stereoscopic methods include a method using a lenticular lens array and a method using a parallax barrier.

In addition, a stereoscopic image display device for displaying both the 2D and 3D images has been developed and is commercially available.

An image quality of the stereoscopic image display device for selectively displaying 2D and 3D images may be deteriorated by operational characteristics of the optical elements. Particularly, when the stereoscopic image display device is switched between a 2D driving mode and a 3D driving mode, the image quality may be deteriorated. When the 2D driving mode is switched to the 3D driving mode, the optical elements are simultaneously switched to the 3D driving mode. Then, a 2D image may be displayed at a portion of a display screen through the optical elements of the 3D driving mode. In addition, when the 3D driving mode is switched to the 2D driving mode, the optical elements are simultaneously switched to the 2D driving mode. Then, a 3D image may be displayed at a portion of the display screen through the optical elements of the 2D driving mode. As described, when the driving mode of the optical elements is different from that of the portion of the display screen on which the 2D or 3D image is displayed, the image quality may be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment according to the present invention, provides a 2 dimensional (2D)/3 dimensional (3D) image display device for controlling an optical element according to a driving mode corresponding to an input image signal, and driving method and an electronic image display device thereof.

In addition, an exemplary embodiment according to the present invention provides a 2 dimensional (2D)/3 dimensional (3D) image display device for reducing or preventing image quality deterioration caused when the input image signal is changed from a 2D image signal to a 3D image signal or vice versa, and a driving method and an electronic image display device thereof.

An exemplary 2D/3D image display device according to an embodiment of the present invention generates 2D or 3D image data according to an input image signal and displays an image corresponding to the 2D or 3D image data. The 2D/3D image display device includes a display unit and a controller. The display unit includes a display panel for displaying the image corresponding to the 2D or 3D image data, and an optical element layer operative in a second driving mode or a first driving mode in accordance with the 2D or 3D image data. The controller converts the optical element layer to be in the first driving mode in a first period before a 3D image signal is displayed on the display panel when the input image signal changes from a 2D image signal to the 3D image signal, and converts the optical element layer to be in the second driving mode in a second period after the 3D image signal is displayed on the display panel when the input image signal changes from the 3D image signal to the 2D image signal.

An exemplary 2D/3D image display device according to another embodiment of the present invention receives an image signal and generates 2D or 3D image data according to the image signal. The 2D/3D image display device includes a controller and a display unit. The controller detects the image signal to determine whether the image signal is a 2D image signal or a 3D image signal, determines a 2D driving mode or a 3D driving mode, and generates the 2D or 3D image data corresponding to the 2D image signal or the 3D image signal. The display unit includes a plurality of data lines, a plurality of scan lines, a plurality of pixels defined by the data lines and the scan lines, and an optical element layer for allowing an image to pass through an entire area of the optical element layer in the 2D driving mode and including an opaque region in the 3D driving mode. The controller is adapted to drive the optical element layer in the 3D driving mode when the image signal changes from the 2D image signal to the 3D image signal, and to drive the optical element layer in the 2D driving mode after one frame of the 2D image signal is displayed on the display unit when the image signal changes from the 3D image signal to the 2D image signal.

An exemplary 2D/3D image display device according to a further embodiment of the present invention displays a 2D image or a 3D image on a display unit according to an input image signal. The display unit includes an optical element layer adapted to operate in one mode among a first driving mode and a second driving mode according to the input image signal. A black screen is displayed for one frame between a frame of a 2D image signal and a frame of a 3D image signal and a driving mode of the optical element layer is converted to the first driving mode when the input image signal changes from the 2D image signal to the 3D image signal, and the black screen is displayed for one frame between the frame of the 3D image signal and the frame of the 2D image signal and the driving mode of the optical element layer changes to the second driving mode when the input image signal is changed from the 3D image signal to the 2D image signal.

An exemplary 2D/3D image display device according to a still further embodiment of the present invention receives an image signal and displays a 2D image or a 3D image according to the input image signal. The 2D/3D image display device includes a controller, a display panel, an optical element layer, a light source, a light source controller, and an optical element layer driver. The controller detects the image signal, determines whether the image signal is a 2D image signal or a 3D image signal, and determines a 2D driving mode or a 3D driving mode according to the image signal. The display panel includes a plurality of pixels. The optical element layer allows an entire said 2D image to be transmitted (or to pass through) in the 2D driving mode, and includes an opaque region in the 3D driving mode. The light source provides a backlight to the display panel. The light source controller turns off the light source for a first period between a frame of the 2D image signal and a frame of the 3D image signal when the image signal changes from the 2D image signal to the 3D image signal, and turns off the light source for a second period between the frame of the 3D image signal and the frame of the 2D image signal when the image signal changes from the 3D image signal to the 2D image signal. The optical element layer driver converts the driving mode of the optical element layer to the 3D driving mode for the first period and converts the driving mode of the optical element layer to the 2D driving mode for the second period according to an operation of the controller.

In an exemplary driving method of a 2D/3D image display device including a display unit for displaying a 2D image or a 3D image according to an image signal and an optical element layer having a first driving mode and a second driving mode according to the 3D image or the 2D image, a) the image signal is detected to determine whether the image signal is a 2D image signal or a 3D image signal, b) it is determined whether the image signal of a current frame and the image signal of a previous frame are respectively the 2D and 3D image signals or the 3D and 2D image signals, c) according to a result of b), when the image signal of the current frame and the image signal of the previous frame are respectively the 3D and 2D image signals, the optical element layer is driven in the first driving mode after the 2D image signal of the previous frame is finished, and d) according to the result of b), when the image signal of the current frame and the image signal of the previous frame are respectively the 2D image signal and the 3D image signal, the optical element layer is driven in the second driving mode after the 2D image signal of the current frame is finished.

In an exemplary driving method of a 2D/3d image display device for displaying a 2D or 3D image according to an image signal, a) the image signal is detected to determine whether the image signal is a 2D image signal or a 3D image signal, b) it is determined whether the image signal of a current frame and the image signal of a previous frame are respectively the 2D and 3D image signals or the 3D and 2D image signals, and c) according to a result of b), when the image signal of the current frame and the image signal of the previous frame are respectively the 3D and 2D image signals, one frame of a black screen is provided between the current frame and the previous frame. In d), according to the result of b), when the image signal of the current frame and the image signal of the previous frame are respectively the 2D and 3D image signals, the one frame of the black screen may be provided between the current frame and the previous frame. The 2D/3D image display device may further include an optical element layer having a first driving mode corresponding to the 3D image signal and a second driving mode corresponding to the 2D image signal. In this case, in c), a driving mode of the optical element layer may be converted at a time when the black screen of the one frame is started, and in d), the driving mode of the optical element layer may be converted after the black screen of the one frame is displayed on the display panel.

In an exemplary driving method of a 2D/3D image display device including a display panel for displaying a 2D or 3D image according to an image signal and a light source for providing a backlight to the display panel, a) the image signal is detected to determine whether the image signal is a 2D image signal or a 3D image signal, b) it is determined whether the image signal of a current frame and the image signal of a previous frame are respectively the 2D and 3D image signals or the 3D and 2D image signals, and c) according to a result of b), when the image signal of the current frame and the image signal of the previous frame are respectively the 3D and 2D image signals, the light source is turned off for a first period between the current frame and the previous frame. In addition, d) according to the result of b), the light source may be turned off for a second period between the current frame and the previous frame when the image signal of the current frame and the image signal of the previous frame are respectively the 2D image signal and the 3D image signal.

An exemplary electronic image display device according to an embodiment of the present invention includes a display panel and an optical element layer. The display panel includes a plurality of data lines, a plurality of scan lines, and a plurality of pixels defined by the data lines and the scan lines. The optical element layer operates in a first mode or a second mode according to an input signal, the optical element layer being adjacent the display panel. The optical element layer is driven in the first mode within a first period before a previous plane image is changed to a current stereoscopic image, and is driven in the second driving mode after a second period from a time when a previous stereoscopic image is changed to a current plane image.

An exemplary electronic image display device according to another embodiment of the present invention includes a display panel and an optical element layer. The display panel includes a plurality of data lines, a plurality of scan lines, a plurality of pixels defined by the data lines and the scan lines, the pixels being defined in at least a first area and a second area of the display panel. The optical element layer corresponds to the first area and operates in a first mode or a second mode according to an input signal. The optical element layer is driven in the first mode within a first period before a previous plane image is changed to a current stereoscopic image, and is driven in the second mode after a second period from a time when a previous stereoscopic image is changed to a current plane image.

DETAILED DESCRIPTION OF THE EMBODIMENTS

Figure 1:
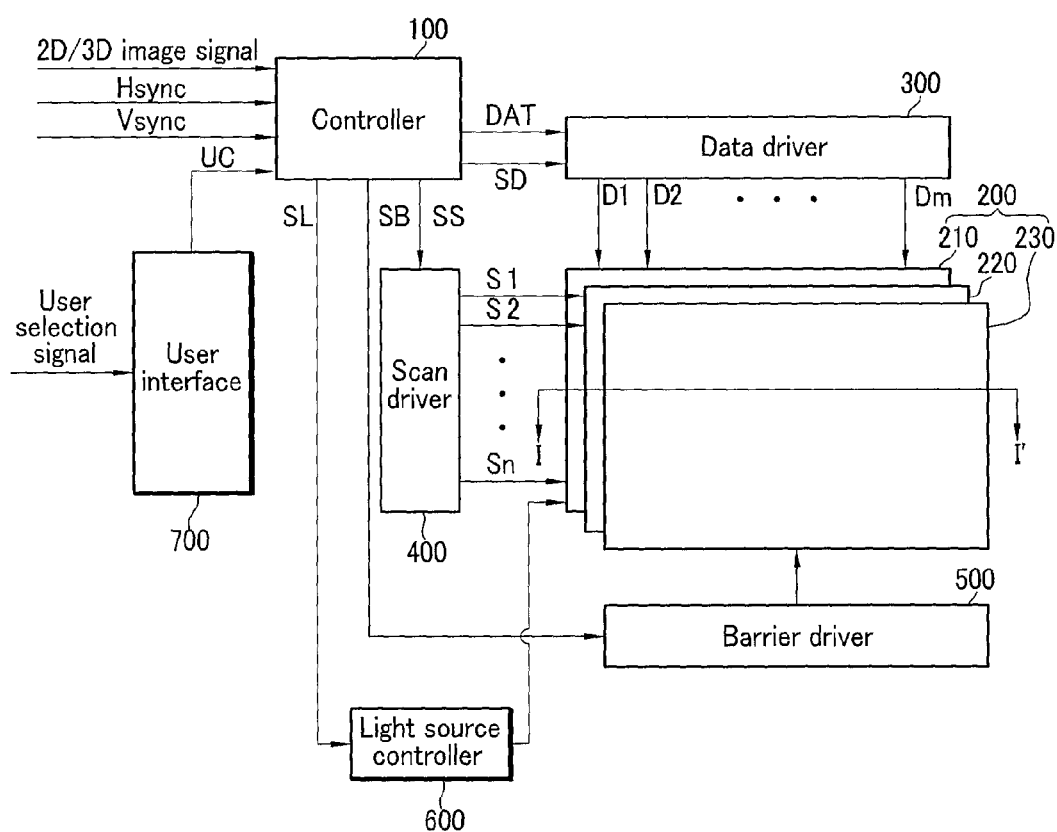
FIG. 1 is a block diagram of a stereoscopic image display device, which is an electronic image display device, according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise" and variations such as "comprises" or "comprising" will be understood to imply the inclusion of stated elements but not the exclusion of any other elements.

FIG. 1 is a block diagram of a stereoscopic image display device, which is an electronic image display device, according to an exemplary embodiment of the present invention.

As shown in FIG. 1, the stereoscopic image display device according to the exemplary embodiment of the present invention may selectively display a 2D image or a 3D image. The stereoscopic image display device includes a controller 100, a display unit 200, a data driver 300, a scan driver 400, a barrier driver 500, a light source controller 600, and a user interface 700.

The controller 100 externally receives a 2D/3D image signal IS, a horizontal synchronization signal Hsync, and a vertical synchronization signal Vsync, generates a scan driver control signal SS, a data driver control signal SD, an image data signal DAT, a light source controller control signal SL, and a barrier driver control signal SB, and respectively outputs them to the scan driver 400, the data driver 300, the light source controller 600, and the barrier driver 500. Here, the 2D/3D image signal IS input to the controller 100 may be one among ordinary 2D image data, 3D graphic data including 3D spatial coordinate and surface information of an object used to stereoscopically display an image on a plane, and 3D image data including respective view point image data. The controller according to the exemplary embodiment of the present invention determines a driving mode according to the input image signal or a user preference. In further detail, the driving mode includes the 2D driving mode and the 3D driving mode, and the barrier driver control signal SB according to each driving mode operates the barrier driver 500 according to the corresponding driving mode.

The display unit 200 includes a light source 210, a display panel 220, and a barrier 230. The display unit 200 according to an exemplary embodiment of the present invention is formed by sequentially stacking the light source 210, the display panel 220, and the barrier 230. A parallax barrier is used as an optical element layer according to one exemplary embodiment of the present invention, which will be simply referred to as the "barrier 230". The display panel 220 according to a first exemplary embodiment of the present invention may be a liquid crystal display panel. While the barrier 230 covers the entire area of the display panel 220 in one embodiment, in other embodiments, the barrier 230 or optical element layer may only cover a portion ("a first area") of the display panel 220 while the rest of the display panel ("a second area") is not covered by the barrier or optical element layer. In such embodiments, the input image signal may include both a 2D ("plane") image signal and a 3D ("stereoscopic") image signal, and the first area can be used to time-divisionally display 2D or 3D images while the second area is used to display 2D images only.

Figure 2:
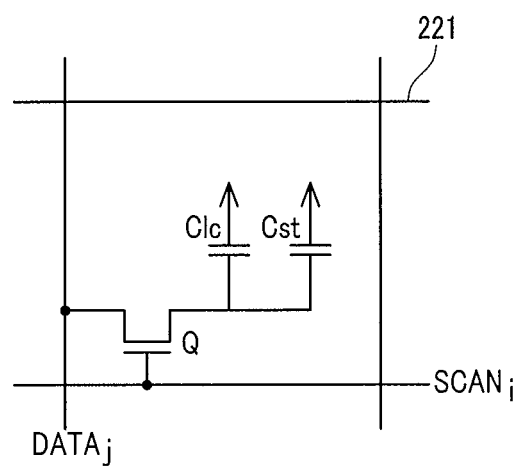
FIG. 2 is a schematic diagram of a pixel of a liquid crystal display panel according to a first exemplary embodiment of the present invention.

FIG. 2 is a schematic diagram of a pixel of the liquid crystal display panel according to the first exemplary embodiment of the present invention. As shown in FIG. 2, a pixel 221 connected to a scan line SCANi and a data line DATAj includes a switch Q, a liquid crystal capacitor Clc, and a sustain capacitor Cst.

The display panel 220 includes a plurality of scan lines (not shown) for transmitting selection signals S1 to Sn, a plurality of data lines (not shown) that are insulated from the plurality of scan lines, cross the plurality of scan lines, and transmit data signals D1 to Dm, and a plurality of subpixels (not shown) formed at crossing regions of the scan lines and the data lines. In the exemplary embodiment of the present invention, it is assumed that a red subpixel for displaying red R, a green subpixel for displaying green G, and a blue subpixel for displaying blue B form one pixel.

The display panel according to a second exemplary embodiment of the present invention may use an organic electroluminescent element rather than a liquid crystal pixel that is a light receiving element.

In further detail, the organic electroluminescent element may be formed ultra-thin, and it has superior color reproducibility. In addition, since the organic electroluminescent element has a high response speed and is formed as a self emission type device, the luminance is great, the configuration thereof is simplified, and it may be easily manufactured to have light weight.

Figure 3:
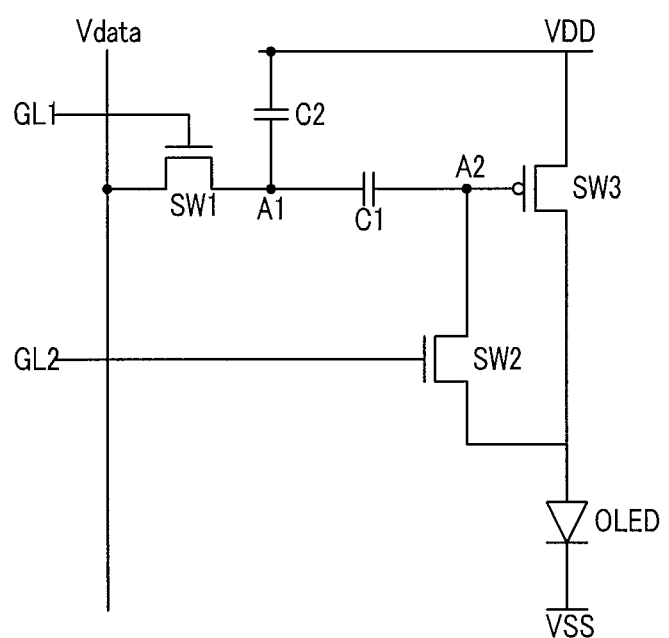
FIG. 3 is a diagram of a pixel circuit of a display panel using an organic electroluminescent element (e.g., an organic light emitting diode (OLED)) according to a second exemplary embodiment of the present invention.

FIG. 3 is a diagram of a pixel circuit of a display panel 220 using the organic electroluminescent element according to the second exemplary embodiment. When pixel circuits including an organic electroluminescent element are used in the display panel 220 of FIG. 1, a backlight such as the light source 210 of FIG. 1 is not required, since organic electroluminescent elements are self-emissive. The display panel 220 including the pixel circuit of FIG. 3 or the display panel including the pixel circuit of FIG. 4 below can be used, for example, without the light source 210.

As shown in FIG. 3, the pixel circuit includes an organic light emitting diode OLED, a switching transistor SW1, a diode-connection transistor SW2, a driving transistor SW3, and capacitors C1 and C2. Here, the switching transistor SW1 is formed as an N-type transistor, the diode-connection transistor SW2 is formed as an N-type transistor, and the driving transistor SW3 is formed as a P-type transistor. In other embodiments, the transistors may be formed as opposite-type transistors according to a gate signal applied from a gate line. An operation of the pixel circuit including a threshold voltage compensation unit will be described.

First, when the switching transistor SW1 is turned on by applying a first selection signal to a first gate line (or scan line) GL1, a data voltage is applied to a node A1. At this time, the data voltage is VDD.

Subsequently, when the diode-connection transistor SW2 is turned on by a second selection signal transmitted from a second gate line GL2 while the switching transistor SW1 is turned on, a gate and a drain of the driving thin film transistor SW3 are connected to be a diode-type transistor. Thereby, the two diodes (OLED and SW3) are electrically coupled on a current path between a first power source voltage VDD and a second power source voltage VSS, and a voltage at a node A2 corresponds to a difference (VDD−|Vth|) obtained by subtracting an absolute value of a threshold voltage Vth of the driving transistor SW3 from the first power source voltage VDD. In this case, the difference is simultaneously (or concurrently) applied to a gate terminal of the driving transistor SW3 and a terminal of the first capacitor C1. When the diode-connection transistor SW2 is turned off by the second selection signal transmitted from the second gate line GL2, the data voltage Vdata is applied to the other terminal of the first capacitor C1. The data voltage Vdata according to the exemplary embodiment of the present invention is a voltage of a data signal Di.

In this case, since the threshold voltage is charged in the first capacitor C1 in a compensation step, a time for reaching a saturation time of the driving transistor SW3 may be reduced. When the driving transistor SW3 is operated, a current flows to the OLED through the driving transistor SW3 in response to the data signal Vdata, and light emission is performed.

In this case, since a voltage difference applied between the terminals of the first capacitor C1 is a voltage of Vth with respect to the node A2 and a voltage difference applied between the terminals of the second capacitor C2 is a voltage of (Vdata−VDD) with respect to the node A1, a voltage Vgs (Vth+Vdata−VDD) applied between a gate and a source of the driving thin film transistor SW3 is a voltage generated when the first capacitor C1 and the second capacitor C2 are connected in series. In this case, a relationship between the voltage Vgs and the current supplied to the OLED is shown as Equation 1.

$$I_{OLED} = \frac{\beta}{2}(Vgs - Vth)^2 = \frac{\beta}{2}(Vdata - VDD)^2 \qquad \text{Equation 1}$$

Figure 4:
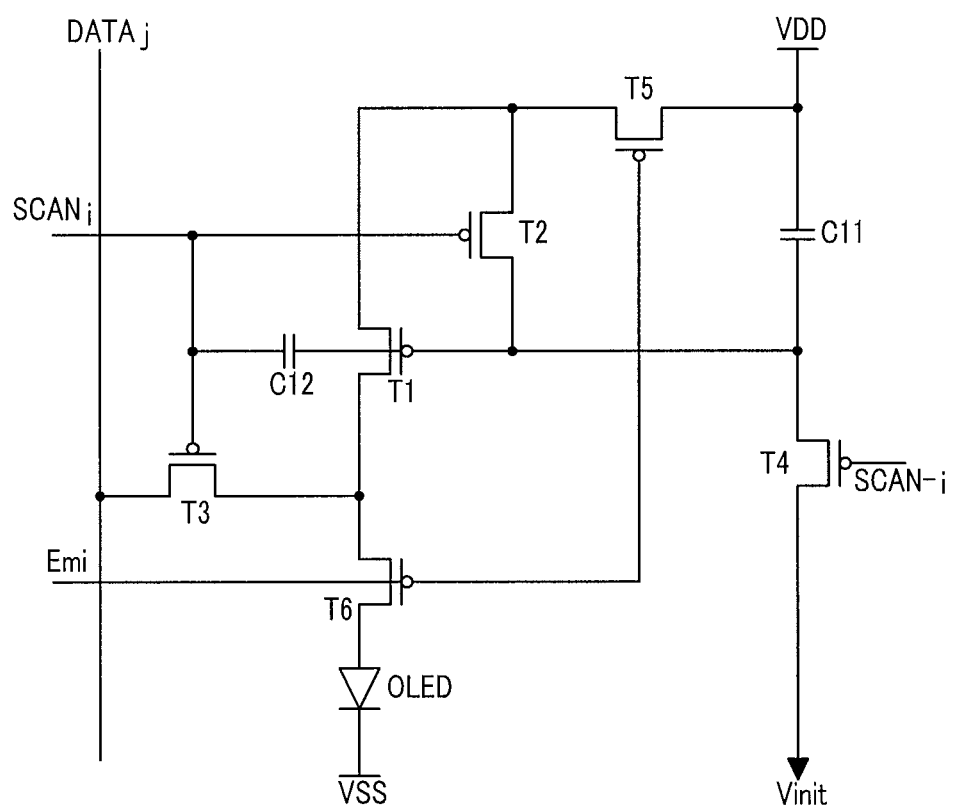
FIG. 4 is a diagram of a pixel circuit according to a third exemplary embodiment of the present invention.

FIG. 4 is a diagram of a pixel circuit according to a third exemplary embodiment of the present invention. An OLED display according to the third exemplary embodiment of the present invention further includes a light emission control line for transmitting a light emission control signal to the display panel.

As shown in FIG. 4, the pixel circuit according to the third exemplary embodiment of the present invention includes first to sixth transistors T1 to T6 and first and second capacitive elements C11 and C12. A source electrode of the third transistor T3 including a gate electrode coupled to the scan line SCANi for receiving a selection signal Si is electrically coupled to the data line, and a drain electrode thereof is electrically coupled to a drain electrode of the first transistor T1. A gate electrode of the first transistor T1 is electrically coupled to a terminal of the second capacitive element C12, and the other terminal of the second capacitive element C12 is coupled to the gate electrode of the third transistor T3 and the scan line SCANi. A source electrode of the first transistor T1 is electrically coupled to a source electrode of the second transistor T2 and a drain electrode of the fifth transistor T5. A gate electrode of the second transistor T2 is electrically coupled to the scan line SCANi. A source electrode of the fifth transistor T5 is electrically coupled to the first power source voltage VDD, and a gate electrode thereof is electrically coupled to a gate electrode of the sixth transistor T6. In addition, the sixth transistor T6 is positioned between the first transistor T1 and an anode of the OLED, and the gate electrode of the sixth transistor T6 is electrically coupled to the light emission control line Emi for transmitting the light emission control signal. The gate electrode of the first transistor T1 is electrically coupled to a source electrode of the fourth transistor T4 and a terminal of the first capacitive element C11, and the other terminal of the first capacitive element C11 is electrically coupled to the first power source voltage VDD. In addition, a drain electrode of the fourth transistor T4 is electrically coupled to an initialization voltage line Vinit, and a gate electrode of the fourth transistor T4 is electrically coupled to a previous scan line SCANi−1.

The first transistor T1 is a driving transistor for converting a voltage applied between the gate electrode and the source electrode into a current, and the second transistor T2 is a diode-connection transistor for diode connecting the first transistor T1. In addition, the third transistor T3 is a switching transistor for applying the data signal Dj applied to the data line DATAj to the first transistor T1 according to the scan signal Si.

The fourth transistor T4 is a switching transistor for applying an initialization voltage applied to the initialization line to the first capacitive element C11, and the fifth transistor T5 is a switching transistor for applying the first power source voltage to the source electrode of the first transistor T.

The sixth transistor T6 is a switching transistor for selectively interrupting the current output from the first transistor T1 from the OLED according to the light emission control signal applied to the light emission control line Emi.

The second capacitive element C12 stores a threshold voltage of the first transistor T1 and compensates a deviation according to the threshold voltage of the first transistor T1. The first capacitive element C11 maintains the data voltage applied between the gate electrode and the source electrode of the first transistor T1.

In an exemplary embodiment of the present invention, the plurality of pixels of the display panel 220 include pixels corresponding to a left-eye image (hereinafter, referred to as "left-eye pixels") and pixels corresponding to a right-eye image (hereinafter, referred to as "right-eye pixels"). In this case, the left-eye and right-eye pixels are alternately arranged. In further detail, the left-eye and right-eye pixels are alternately arranged in parallel to each other to form a stripe or zigzag shape. The arrangement of the left-eye and right-eye pixels may appropriately vary according to the barrier 230.

The barrier 230 is provided at a surface of the display panel 220, and it includes opaque regions and transparent regions formed to correspond to the arrangement of the left-eye and right-eye pixels of the display panel 220. When operating the barrier 230 according to the 3D driving mode, the barrier 230 uses the opaque regions and the transparent regions to separately provide the left-eye image and the right-eye image from the left-eye and right-eye pixels of the display panel 220 in a left eye direction and a right eye direction of an observer. The opaque regions and the transparent regions of the barrier 230 may be formed in the stripe or zigzag shape according to the arrangement of the left-eye and right-eye pixels of the display panel 220. The barrier according to the exemplary embodiment of the present invention controls all the barrier regions to be transparent regions in the 2D driving mode so that an image displayed on the display panel 220 is transmitted (or passes) through the barrier in its entirety.

The light source 210 includes red R, green G, and blue B light emitting diodes (not shown), and outputs lights corresponding to red R, green G, and blue B to the display panel 220 when the display panel 220 is a liquid crystal display panel using the pixel circuit of FIG. 2, for example, or any other suitable non-self emissive display panel. The red R, green G, and blue B light emitting diodes of the light source 210 respectively output red, green and blue lights to the R subpixel, G subpixel, and B subpixel of the display panel 220 in this case.

Figure 5:
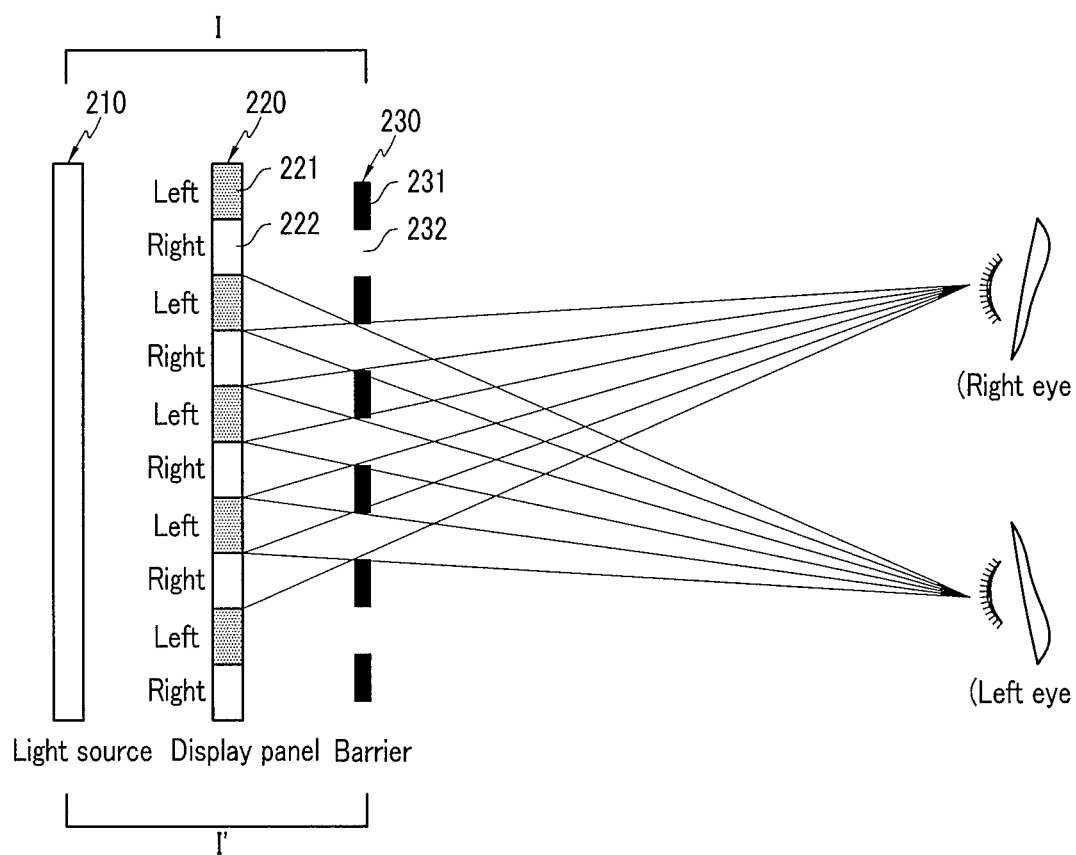
FIG. 5 is a diagram showing an observer observing a stereoscopic image through left eye pixels and right eye pixels, and further showing a cross-section of a light source, a panel, and a barrier from I to I'.

A method for perceiving a stereoscopic image by an observer through the display panel 220 and the barrier 230 shown in FIG. 1 will now be described with reference to FIG. 5. FIG. 5 is a diagram showing an observer observing the stereoscopic image formed by the left-eye pixels and the right-eye pixels, and further showing a cross-section of the light source 210, the panel 220, and the barrier 230 from I to I'.

As shown in FIG. 5, the display panel 220 includes a plurality of left-eye pixels 221 and a plurality of right-eye pixels 222 that are alternately arranged, and the barrier 230 includes opaque regions 231 and transparent regions 232 that are alternately arranged in parallel in the same direction as the arrangement direction of the plurality of left-eye pixels 221 and the plurality of right-eye pixels 222. The left-eye pixels 221 of the display panel 220 project the left-eye image to a left eye through the transparent region 232 of the barrier 230, and the right-eye pixels 222 of the display panel 220 project the right-eye image to a right eye through the transparent region 232 of the barrier 230. The opaque regions 231 of the barrier 230 define a light projection path so that the left-eye pixels 221 and the right-eye pixels 222 of the display panel 220 may respectively project the image to the left eye and the right eye through the transparent regions 232.

The left-eye image projected from the left-eye pixels 221 is formed to have a predetermined disparity with respect to the right-eye image, and the right-eye image projected from the right-eye pixels 222 is formed to have a predetermined disparity with respect to the left-eye image. Accordingly, when the observer respectively perceives the left-eye image projected from the left-eye pixels 221 and the right-eye image projected from the right-eye pixels 222 through the left and right eyes of the observer, depth information of an actual stereoscopic object is obtained, and a stereoscopic effect may be achieved.

The data driver 300 generates an image signal corresponding to an applied image data DAT, and applies it to the data lines D1 to Dm of the display panel 220 according to the data driver control signal. The image signal according to the exemplary embodiment of the present invention may be an analog data voltage that is inverted from the image data DAT.

The scan driver 400 sequentially generates the selection signals S1 to Sn in response to the scan driver control signal SG output from the controller 100 to respectively apply them to the plurality of scan lines of the display panel 220.

The light source controller 600 controls a lighting period of the light emitting diodes of the light source 210 in response to the control signal SL output from the controller 100. In this case, a period for supplying an analog data voltage from the data driver 300 to the data line and a period for lighting the red R, green G, and blue B light emitting diodes by the light source controller 600 may be synchronized by the control signal supplied from the controller 100.

The user interface 700 receives operational commands including the driving mode and transmits them to the controller 100. A user selection signal Uc selects one among the 2D or 3D driving mode. When receiving the user selection signal Uc, the user interface 700 transmits the driving mode selected by the user to the controller 100. A configuration of the controller according to the exemplary embodiment of the present invention will be described with reference to FIG. 6 and FIG. 7.

Figure 6:
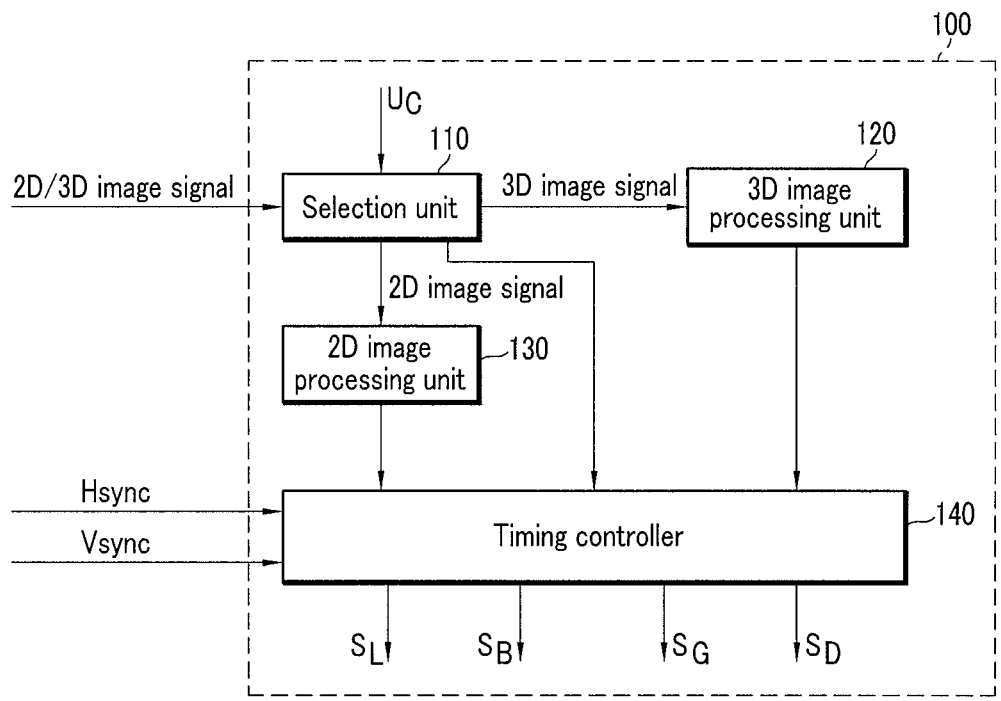
FIG. 6 is a block diagram of a controller according to an exemplary embodiment of the present invention.

FIG. 6 is a block diagram of the controller 100 according to an exemplary embodiment of the present invention.

As shown in FIG. 6, the controller 100 includes a selection unit 110, a 3D image processing unit 120, a 2D image processing unit 130, and a timing controller 140.

The selection unit 110 analyzes the input image signal to determine whether it is the 2D image signal or the 3D image signal, and determines the driving mode according to the user selection signal Uc.

Figure 7:
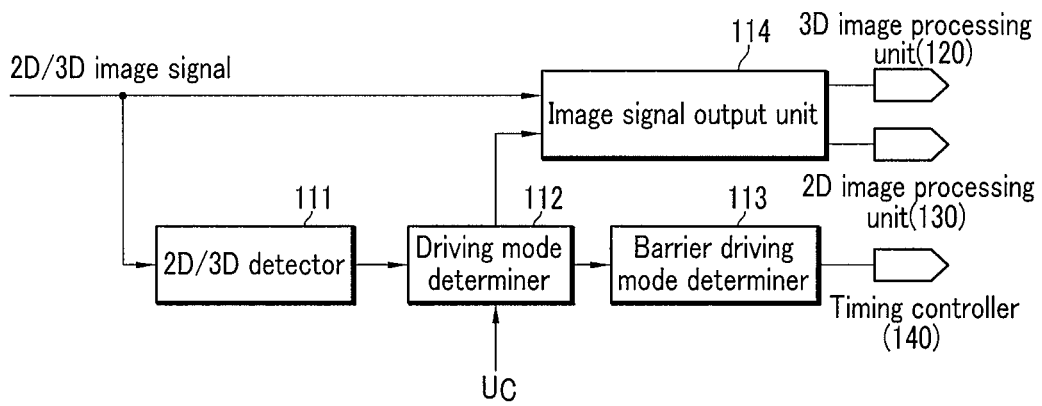
FIG. 7 is a block diagram of a selection unit according to an exemplary embodiment of the present invention.

FIG. 7 is a block diagram of the selection unit 110 according to an exemplary embodiment of the present invention.

As shown in FIG. 7, the selection unit 110 includes a 2D/3D detector 111, a driving mode determiner 112, a barrier driving mode determiner 113, and an image signal output unit 114.

The 2D/3D detector 111 analyzes the image signal to determine whether it is a 2D image signal or a 3D image signal, and transmits a determination result to the driving mode determiner 112. In further detail, the image signal may respectively include determination signals according to the 2D and 3D image signals. The 2D/3D detector 111 detects the respective determination signals according to the 2D and 3D image signals, and determines whether the input image signal is a 2D image signal or a 3D image signal. The driving mode determiner 112 determines the driving mode according to the image signal detection result and the user selection signal Uc. In further detail, when the image signal is detected to be a 2D image signal and the user selection signal Uc indicates the 3D driving mode, the driving mode determiner 112 uses the 2D image signal to determine whether 3D image data can be generated. An additional configuration and/or components may be required to generate the 3D image data, but the 2D/3D image display device does not include the additional configuration in one exemplary embodiment of the present invention. In other embodiments, the 2D/3D image display device may include additional components and/or configuration for generating 3D image data. When the driving mode determiner 112 cannot generate the 3D image data by using the 2D image signal because it does not include additional configuration and/or components, the driving mode determiner 112 determines the 2D driving mode regardless of the user selection signal Uc. When the 2D image signal cannot be converted to 3D image data, 2D image data are displayed on the display panel. In this case, when the barrier is in the 3D driving mode, the image quality may be deteriorated. In the 2D/3D image display device according to one exemplary embodiment of the present invention and the driving method thereof, when the user selects the 3D image and the 2D image signal cannot be converted to 3D image data, the barrier may be maintained to be in the 2D driving mode regardless of the user selection. However, when the 2D/3D image display device according to the exemplary embodiment of the present invention includes the configuration and/or components for converting 2D image data to 3D image data, the driving mode is controlled according to the user selection signal Uc.

When the user selection is the 2D driving mode and a 3D image signal is input, the 3D image signal is displayed in the 2D driving mode according to the user selection. Since the 3D image signal generally includes a 2D image signal, the controller 100 detects the 2D image signal from the 3D image signal and uses the detected 2D image signal to generate 2D image data. When the user selection signal is not detected, the driving mode determiner 112 determines the driving mode according to the image signal. After determining the driving mode, the driving mode determiner 112 transmits the determined driving mode to the image signal output unit 114 and the barrier driving mode determiner 113.

The barrier driving mode determiner 113 determines the barrier driving mode according to the input driving mode from the driving mode determiner 112. The barrier driving mode determiner 113 generates a barrier driving mode control signal, and transmits it to the timing controller 140. The barrier driving mode control signal corresponds to the determined driving mode. In a case of the 2D driving mode, in one embodiment, the barrier is controlled so that the image displayed on the display panel entirely passes through the barrier. In a case of the 3D driving mode, the barrier is controlled so as to be divided into opaque regions and transparent regions. When the driving mode is converted from the 2D driving mode to the 3D driving mode, the barrier driving mode determiner 113 generates a barrier driving mode control signal for converting the barrier driving mode to the 3D driving mode and transmits the barrier driving mode control signal to the timing controller 140 before the 3D image data are transmitted to the data line by the data driver 300. When the driving mode is converted from the 3D driving mode to the 2D driving mode, the barrier is maintained to be in the 3D driving mode until one 2D image data frame is displayed on the entire display panel 220. Right afterwards, the barrier driving mode determiner generates the barrier driving mode control signal for converting the barrier driving mode to the 3D driving mode, and transmits the barrier driving mode control signal to the timing controller 140.

The image signal output unit 114 transmits the image signal to the 3D image processing unit 120 or the 2D image processing unit 130 according to the driving mode transmitted from the driving mode determiner 112. The image signal output unit 114 according to the exemplary embodiment of the present invention stores the image signal for a period of time (e.g., a predetermined time), and then transmits the image signal to the 3D image processing unit 120 or the 2D image processing unit 130 according to the determined driving mode after the driving mode has been determined. The period of time may be shorter than one frame of the image data.

The 3D image processing unit 120 generates the stereoscopic image data based on the input 3D image signal, and transmits the generated stereoscopic image data to the timing controller 140.

The 2D image processing unit 130 generates the image data based on the input 2D image signal, and transmits the generated image data to the timing controller 140.

The timing controller 140 externally receives a horizontal synchronization signal Hsync and a vertical synchronization signal Vsync. In addition, the timing controller 140 receives the image data from the 3D image processing unit 120 or the 2D image processing unit 130, and receives the barrier driving mode control signal from the selection unit 110. The timing controller 140 transmits the image data to the data driver 300 according to the horizontal synchronization signal Hsync and the vertical synchronization signal Vsync, and transmits the scan driver control signal to the scan driver. The timing controller 140 transmits a signal for driving the barrier according to the barrier driving mode control signal to the barrier. When the driving mode is converted from the 2D driving mode to the 3D driving mode, the timing controller 140 transmits a barrier control signal for indicating the 3D driving mode after one frame of the 2D image data is finished. Further, when the driving mode is converted from the 3D driving mode to the 2D driving mode, the timing controller 140 transmits the barrier control signal for indicating the 2D driving mode after one frame of the 2D image data is finished. The timing controller 140 transmits the control signal SL for controlling the lighting of the light source to the light source controller.

A method for driving the barrier 230 by the barrier driver 500 according to the barrier control signal transmitted from the timing controller 140 will be described with reference to FIG. 8.

Figure 8:
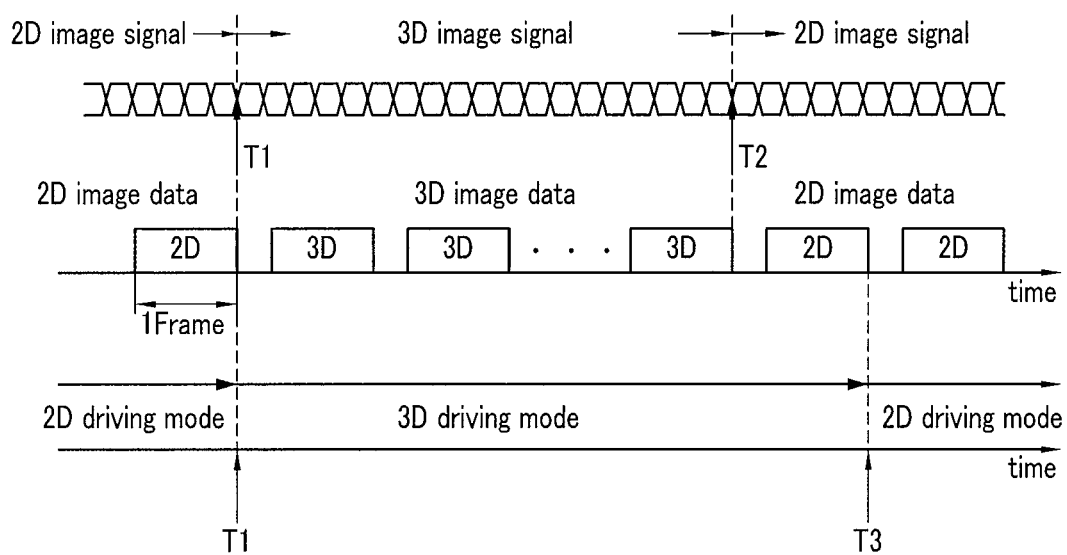
FIG. 8 is a diagram representing an image signal, image data, and a barrier driving mode at the same point in time.

FIG. 8 is a diagram representing the image signal, image data, and the barrier driving mode at the same point in time.

As shown in FIG. 8, when the image signal changes from a 2D image signal to a 3D image signal at a time T1, the barrier driving mode control signal generated by the selection unit is transmitted to the timing controller 140, and the timing controller 140 detects the barrier driving mode control signal and an ending point of one frame of the last 2D image data and transmits the barrier control signal for indicating the 3D driving mode to the barrier driver. This way, the barrier driving mode is substantially converted to the 3D driving mode at the time T1. Further, when the image signal changes from the 3D image signal to the 2D image signal at a time T2, the barrier driving mode control signal generated by the selection unit is transmitted to the timing controller 140, and the timing controller 140 detects the barrier driving mode control signal and the ending point of one frame of the first 2D image data and transmits the barrier control signal for indicating the 2D driving mode to the barrier driver. This way, the barrier driving mode is converted to the 2D driving mode at a time T3.

Figure 9:
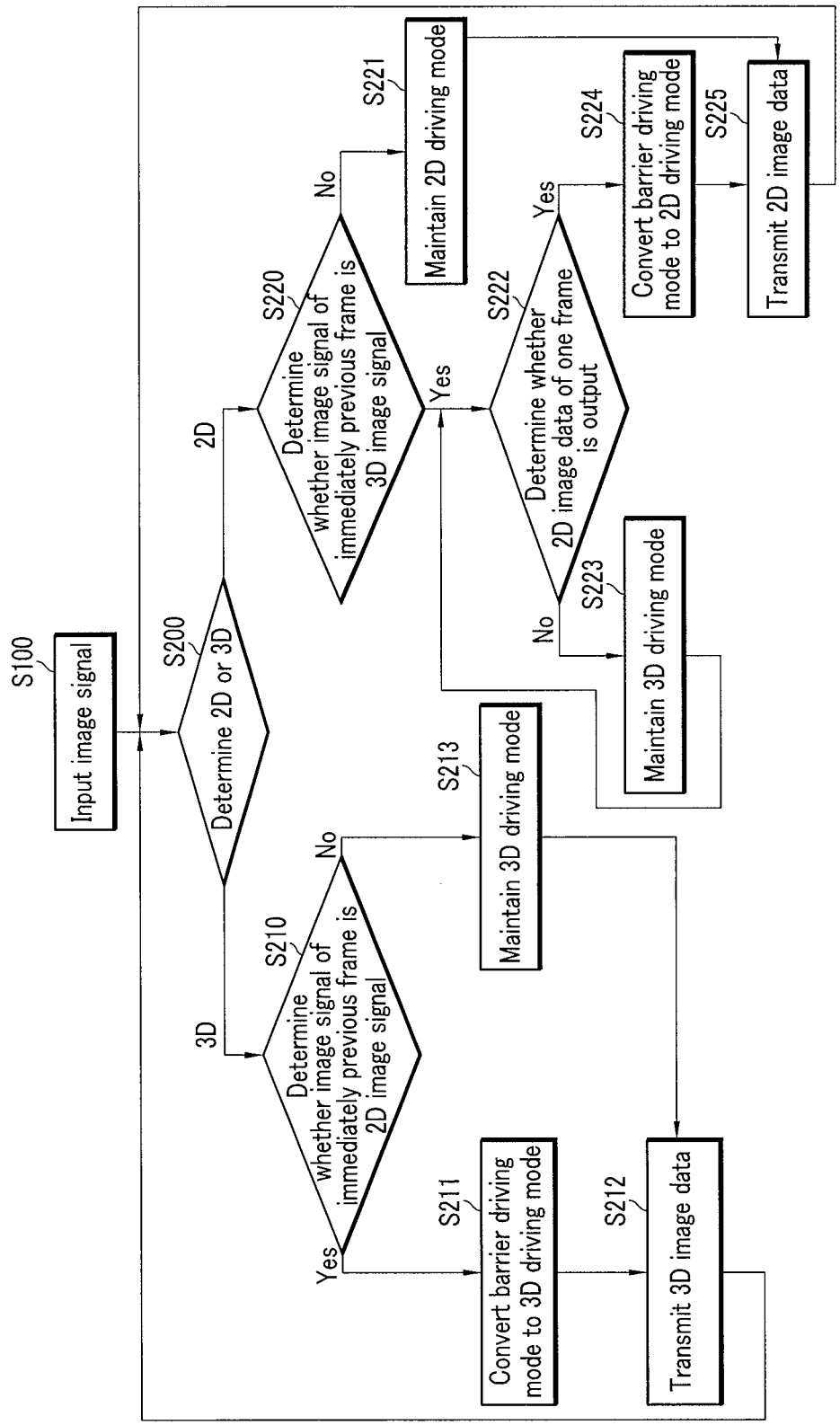
FIG. 9 is a flowchart illustrating a driving method of a 2D/3D image display device according to an exemplary embodiment of the present invention.

FIG. 9 is a flowchart representing a driving method of the 2D/3D image display device according to the exemplary embodiment of the present invention. In FIG. 9, it is assumed that the 2D or 3D driving mode is determined according to the currently input image signal regardless of the user selection signal.

The controller 100 receives the image signal in step S100, and determines in step S200 whether the input image signal is a 2D or 3D image signal. When it is determined in step S200 that the input image signal is a 2D image signal, the controller 100 determines in step S220 whether the image signal of an immediately previous frame is a 3D image signal. When it is determined in step S220 that the image signal of the immediately previous frame is not the 3D image signal, the barrier driver maintains the barrier driving mode to be in the 2D driving mode in step S221. The data driver 300 then transmits the 2D image data to the display panel in step S225. When it is determined in step S220 that the image signal of the immediately previous frame is a 3D image signal, the controller determines in step S222 whether the 2D image data of one frame is transmitted to the data driver 300. When the 2D image data of the frame is not transmitted, the barrier driver maintains the barrier driving mode to be the 3D driving mode in step S223. When the 2D image data of the one first frame is output from the data driver 300 to the display panel after the input image signal is changed from the 3D image signal to the 2D image signal in step S221, the barrier driver 500 converts the barrier driving mode to the 2D driving mode in step S224. The data driver 300 transmits the 2D image data to the display panel S225.

When it is determined in step S200 that the input image signal is a 3D image signal, the controller 100 determines in step S210 whether the image signal of the immediately previous frame is a 2D image signal. When it is determined in step S210 that the image signal of the immediately previous frame is not a 2D image signal, the barrier driver 500 maintains the barrier driving mode to be the 3D driving mode in step S213. The data driver 300 transmits the 3D image data to the display panel in step S212. When it is determined in step S210 that the image signal of the immediately previous frame is a 2D image signal, the barrier driver 500 converts the barrier driving mode to the 3D driving mode in step S211. The data driver 300 transmits the 3D image data to the display panel S212.

As described, in the 2D/3D image display device, which is an electronic image display device, according to an exemplary embodiment of the present invention and the driving method thereof, the barrier driving mode is converted to the 3D driving mode before the 3D image is displayed, and therefore a clearer 3D image may be provided. In addition, when the 3D image is changed to a 2D image (i.e., the input image signal is changed from a 3D image signal to a 2D image signal), during a period of displaying the 2D image of the first one frame, the 3D image is displayed clearer on a partial area (or portion) of the display panel.

Further, when the 2D image is changed to the 3D image or the 3D image is changed to the 2D image, the 2D image and the 3D image are displayed together on the display panel. In this case, the barrier is controlled, and therefore the image quality may be improved. However, during one frame for converting the 2D image to the 3D image or the 3D image to the 2D image, the user may see the 2D image through the barrier of the 3D driving mode on a partial area (or portion) of the display panel, or the user may see the 3D image through the barrier of the 2D driving mode. The driving method of the 2D/3D image display device to prevent the above problem will be described with reference to FIG. 10 and FIG. 11.

The 2D/3D image display device, which is an electronic image display device, according to a fourth exemplary embodiment of the present invention will now be described.

Figure 10:
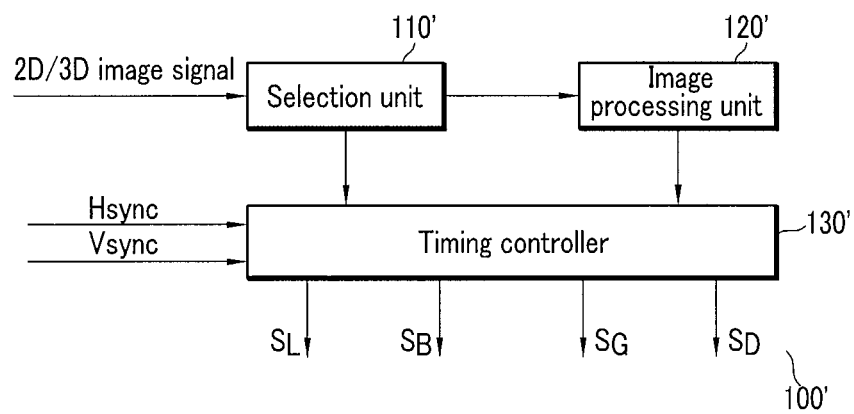
FIG. 10 is a block diagram of a controller according to a fourth exemplary embodiment of the present invention.

FIG. 10 is a block diagram of a controller 100' according to the fourth exemplary embodiment of the present invention.

As shown in FIG. 10, the controller 100' includes a selection unit 110', an image processing unit 120', and a timing controller 130'.

The selection unit 110' detects the input image signal and determines whether it is a 2D image signal or a 3D image signal. The selection unit 110' generates a first driving mode change control signal when it detects that the input image signal has changed from a 2D image signal to a 3D image signal, and the selection unit 110' generates a second driving mode change control signal when it detects that the input image signal has changed from a 3D image signal to a 2D image signal. The generated first and second driving mode change control signals are transmitted to the timing controller 130' and the image processing unit 120'. The selection unit 110' transmits the input image signal to the image processing unit 120'.

The image processing unit 120' includes a 2D image processing unit (not shown) and a 3D image processing unit (not shown). When the image signal is a 2D image signal, the 2D image signal is input to the 2D image processing unit 120' and 2D image data are generated. When the image signal is a 3D image signal, the 3D image signal is input to the 3D image processing unit 120' and the 3D image data are generated. The generated 2D and 3D image data are transmitted to the timing controller 130'. When the first and second driving mode change control signals are input, the image processing unit 120' generates the image data for displaying a black screen and transmits the image data to the timing controller 130'.

The timing controller 130' receives the vertical synchronization signal, the horizontal synchronization signal, the first and second driving mode change control signals, and the image data. The timing controller 130' transmits the image data to the data driver according to the vertical synchronization signal and the horizontal synchronization signal, and transmits the scan control signal to the scan driver.

When the timing controller 130 receives the first driving mode change control signal, the timing controller 130 generates the barrier driver control signal for changing the barrier driving mode to the 3D driving mode, transmits the barrier driver control signal to the barrier driver, and transmits the image data for displaying the black screen to the data driver for one frame. When the timing controller 130' receives the second driving mode change control signal, the timing controller 130' transmits the image data for displaying the black screen to the data driver for one frame, generates the barrier driver control signal for changing the barrier driving mode to the 2D driving mode, and transmits the barrier driver control signal to the barrier driver. The data driver (not shown) transmits the image data for displaying the black screen that are output according to the first and second driving mode change control signals to the display panel for one frame. Thereby, since the 3D image data are not displayed on the display panel while the barrier driving mode is converted from the 2D driving mode to the 3D driving mode, the 2D image and the 3D image are not simultaneously (or concurrently) displayed on the display panel. In addition, while the barrier driving mode is converted from the 3D driving mode to the 2D driving mode, the 3D image data are not displayed on the display panel. Accordingly, the 2D image and the 3D image are not simultaneously (or concurrently) displayed on the display panel.

The driving method will be described in further detail with respect to FIG. 11.

Figure 11:
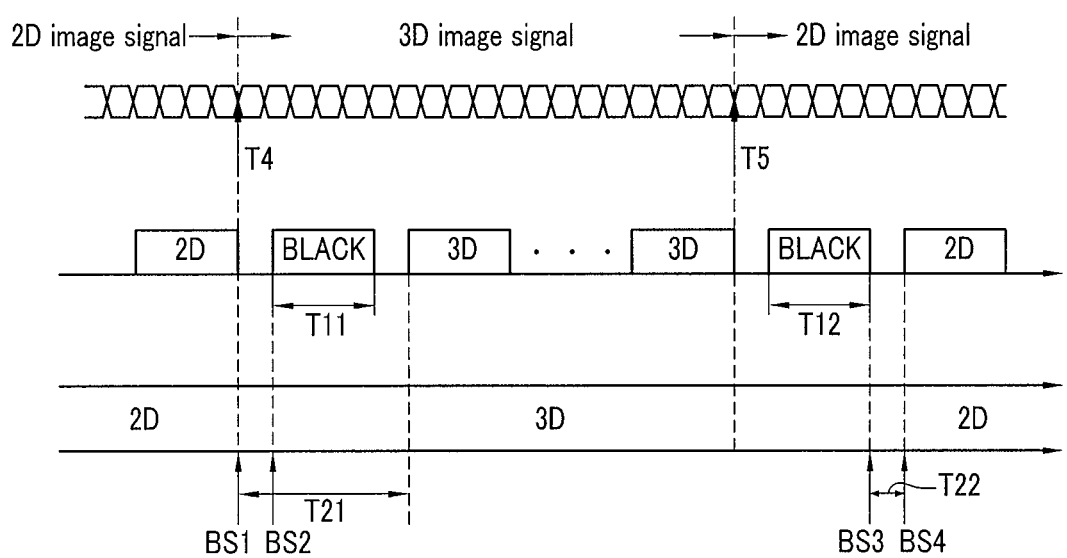
FIG. 11 is a diagram representing an image data signal and a barrier driving mode of a 2D/3D image display device according to the fourth exemplary embodiment of the present invention.

FIG. 11 is a diagram representing an image data signal and a barrier driving mode of a 2D/3D image display device according to the fourth exemplary embodiment of the present invention.

In reference to FIGS. 10 and 11, when the image signal changes from a 2D image signal to a 3D image signal at a time T4, the selection unit 110' generates a first driving mode change signal. The generated first driving mode change signal is transmitted to the image processing unit 120', and the image processing unit 120' generates the image data for displaying the black screen for a period T11. The period T11 according to the fourth exemplary embodiment of the present invention corresponds to one frame. The timing controller 130' transmits the barrier driver control signal for converting the barrier driving mode to the 3D driving mode according to the first driving mode change signal at a time BS1 or after the time BS1. The barrier is generally realized as a liquid crystal display panel, and a time delay is caused by characteristics of the liquid crystal until the driving mode is changed. Accordingly, when the time delay is longer than one frame, it is required to convert the barrier driving mode from the 2D driving mode to the 3D driving mode according to the time delay at the time BS1 or between the time BS1 and a time BS2. When the time delay is not longer than one frame, the barrier driving mode is converted to the 3D driving mode at the time BS2 or soon after the time BS2 in consideration of the time delay. Thereby, the barrier driving mode is converted from the 2D driving mode to the 3D driving mode within a period T21.

In addition, when the image signal changes from a 3D image signal to a 2D image signal at a time T5, the selection unit 110' generates a second driving mode change signal. The generated second driving mode change signal is transmitted to the image processing unit 120', and the image processing unit 120' generates the image data for displaying the black screen during a period T12. The period T12 according to the fourth exemplary embodiment of the present invention corresponds to one frame. The timing controller 130' transmits the barrier driver control signal for converting the barrier driving mode to the 2D driving mode according to the second driving mode change signal during a time BS3 or after the time BS3. The barrier driver converts the barrier driving mode from the 3D driving mode to the 2D driving mode according to the barrier driver control signal during the period T22. In further detail, since the time delay may be caused according to the barrier driving mode variation, the barrier driving mode conversion is started at the time BS3 to expedite the conversion of the driving mode.

In a similar manner as a method for inserting the black screen of one frame, the 2D/3D image display device in one exemplary embodiment may use the light source to prevent the 2D and 3D images from being simultaneously (or concurrently) displayed on the display panel, when the display panel 220 is a liquid crystal display panel or other suitable non-self emissive display panel. In further detail, when the timing controller 130 receives the first and second driving mode change signals, the timing controller 130 turns off the light source and maintains the light source in the turned off state during the period T11 or the period T12. That is, the timing controller 130 transmits a light source turn-off control signal to the light source controller 600 during the period T11 and the period T12, and the light source controller 600 turns off the light source according to the light source turn-off control signal during the period T11 and the T12. In addition, the timing controller 130' starts to perform the barrier driving mode conversion from a time for turning off the light source according to the first and second driving mode change signals. Thereby, the same effect as the black screen on the display panel may be achieved. In this case, the timing controller 130' does not output the image data output from the image processing unit 120' for one frame, and then the timing controller 130' may transmit the image data that are delayed for one frame to the data driver 300. In this case, the light source may be turned off during the period T21 that is longer than the period T11 according to the delay caused by the barrier driving mode variation. Accordingly, while the barrier driving mode is changed, the same effect as that of the black screen is performed on the display panel.

As described, when it is detected that the 2D image is changed to the 3D image or the 3D image is changed to the 2D image, the selection unit of the 2D/3D image display device according to the fourth exemplary embodiment of the present invention generates the driving mode change signal and transmits it to the timing controller. According to the driving mode conversion signal, the timing controller does not transmit the first image data to the data driver, and it transmits the image data for displaying the black screen to the data driver. In addition, the timing controller transmits the control signal for converting the barrier driving mode to the barrier driver. When the 2D image is changed to the 3D image, the barrier driving mode may be converted during a period for displaying the black screen on the display panel. In addition, when the 3D image is changed to the 2D image, the barrier driving mode is started to be converted after one frame of the black screen is entirely displayed, so that the 3D image may not be displayed on the 2D driving mode. Accordingly, in the 2D/3D image display device according to the fourth exemplary embodiment of the present invention and the driving mode, the image quality deterioration caused by the driving mode variation may be reduced or prevented when the image signal changes from a 2D image signal to a 3D image signal and vice versa.

In the exemplary embodiments of the present invention, while it has been described that the display panel displays a 2D image (i.e., a plane image) or a 3D image (i.e., a stereoscopic image), it is not limited thereto. In one exemplary embodiment of the present invention, a partial area (or portion) of the display panel may display the stereoscopic image. In this case, the externally input image signal may include both of the stereoscopic image signal and the plane image signal. Further, the display panel includes a first area that time-divisionally displays the stereoscopic image or the plane image according to the stereoscopic image signal or the plane image signal, and a second area that displays the plane image or the stereoscopic image. The first area may be driven according to the exemplary embodiment of the present invention. That is, the electronic image display device according to the exemplary embodiment of the present invention includes the barrier corresponding to the first area of the display panel, and the barrier is driven according to the image displayed on the first area. In this case, when the second area displays only a plane image, the electronic image display device according to the exemplary embodiment of the present invention may not include the barrier corresponding to the second area. When the second area displays only the stereoscopic image, the electronic image display device according to the exemplary embodiment of the present invention includes the barrier corresponding to the second area, and the barrier is driven in the driving mode for displaying the stereoscopic image.

According to the 2D/3D image display device according to one exemplary embodiment of the present invention, the driving method, and the electronic image display device, when the image signal changes from the 2D image signal to the 3D image signal or changes from the 3D image signal to the 2D image signal on the display panel displaying the image or the partial area (or portion) of the display panel, the driving mode of the optical element is synchronized with the displayed image to reduce the image quality deterioration.

According to the 2D/3D image display device according to one exemplary embodiment of the present invention, the driving method, and the electronic image display device, when the image signal changes from the 2D image signal to the 3D image signal or changes from the 3D image signal to the 2D image signal, the black screen is provided so that the 2D and 3D images are not simultaneously (or concurrently) displayed on one screen, and the image quality deterioration may be prevented or reduced.

According to the 2D/3D image display device according to one exemplary embodiment of the present invention, the 2D image signal is prevented from being displayed on the 3D driving mode by the user selection, so the image quality deterioration may be prevented or reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:
1. A 2 dimensional (2D)/3 dimensional (3D) image display device for generating 2D or 3D image data according to an input image signal and displaying an image corresponding to the 2D or 3D image data, the 2D/3D image display device comprising:
a display unit comprising:
a display panel for displaying the image corresponding to the 2D or 3D image data; and
an optical element layer operative in a second driving mode or a first driving mode in accordance with the 2D or 3D image data, respectively; and
a controller for converting a driving mode of the optical element layer to be in the first driving mode in a first period before a 3D image signal is displayed on the display panel when the input image signal changes from a 2D image signal to the 3D image signal, and converting the driving mode of the optical element layer to be in the second driving mode in a second period right after one frame of the 2D image signal is displayed on the entire display panel while the optical element layer is in the first driving mode, when the input image signal changes from the 3D image signal to the 2D image signal.

2. The 2D/3D image display device of claim 1, wherein, in the first driving mode, a left-eye image and a right-eye image are generated in response to the 3D image signal, and the optical element layer is used to provide the left-eye image and the right-eye image to left and right eyes, respectively, of a user.

3. The 2D/3D image display device of claim 2, wherein the left-eye image has a predetermined disparity with respect to the right-eye image.

4. The 2D/3D image display device of claim 3, wherein the optical element layer is realized using a parallax barrier method, the display panel includes a plurality of left-eye pixels and a plurality of right-eye pixels, and the optical element layer includes a barrier disposed to correspond to the left-eye pixels and the right-eye pixels.

5. The 2D/3D image display device of claim 1, wherein the first period is a period from after one frame of the 2D image signal is displayed on the display panel just before the input image signal changes from the 2D image signal to the 3D image signal, until a first frame of the 3D image signal is displayed on the display panel.

6. The 2D/3D image display device of claim 1, wherein the input image signal is displayed as a 2D image or a 3D image according to a user selection.

7. The 2D/3D image display device of claim 6, wherein, when the input image signal is the 2D image signal and the user selects displaying the 3D image, the 2D image data are generated and the optical element layer is driven in the second driving mode when the 2D image signal cannot be converted to the 3D image data.

8. A 2 dimensional (2D)/3 dimensional (3D) image display device for receiving an image signal and generating 2D or 3D image data according to the image signal, the 2D/3D image display device comprising:
a controller for detecting the image signal to determine whether the image signal is a 2D image signal or a 3D image signal, determining a 2D driving mode or a 3D driving mode, and generating the 2D or 3D image data corresponding to the 2D image signal or the 3D image signal; and
a display unit comprising a plurality of data lines, a plurality of scan lines, a plurality of pixels defined by the data lines and the scan lines, and an optical element layer for allowing an image to pass through an entire area of the optical element layer in the 2D driving mode and including an opaque region in the 3D driving mode,
wherein the controller is adapted to drive the optical element layer in the 3D driving mode when the image signal changes from the 2D image signal to the 3D image signal, and to drive the optical element layer in the 2D driving mode right after one frame of the 2D image signal is displayed on the entire display unit while the optical element layer is in the 3D driving mode, when the image signal changes from the 3D image signal to the 2D image signal.

9. The 2D/3D image display device of claim 8, wherein the controller is adapted to receive the image signal to determine whether it is the 2D image signal or the 3D image signal, to generate an optical element layer control signal of the optical element layer according to a result of the determination, and to generate a display control signal,
the device further comprising a driver for transmitting the 2D or 3D image data to the display unit according to the display control signal, and
an optical element driver for controlling the optical element layer according to the optical element layer control signal.

10. The 2D/3D image display device of claim 9, wherein the controller comprises:
a selection unit for receiving the image signal, determining whether the image signal is the 2D image signal or the 3D image signal, and determining a driving mode of the optical element layer;
a 3D image processing unit for receiving the 3D image signal according to the determination result of the selection unit, and generating the 3D image data;
a 2D image processing unit for receiving the 2D image signal according to the determination result of the selection unit, and generating the 2D image data; and
a timing controller for transmitting the 2D image data input from the 2D image processing unit or the 3D image data input from the 3D image processing unit to the driver according to an external vertical synchronization signal and a horizontal synchronization signal.

11. The 2D/3D image display device of claim 10, wherein the selection unit is adapted to detect the image signal, and to generate a 2D driving mode optical element layer control signal and a 3D driving mode optical element layer control signal in response to the 2D image signal and the 3D image signal, respectively.

12. The 2D/3D image display device of claim 9, wherein the driver comprises a scan driver and a data driver, the scan driver is adapted to transmit a plurality of selection signals to the plurality of scan lines according to the display control signal, and the data driver is adapted to transmit the 2D or 3D image data to the plurality of data lines according to the display control signal.

13. The 2D/3D image display device of claim 8, wherein the optical element layer is realized using a parallax barrier method.

14. The 2D/3D image display device of claim 13, further comprising a user interface for receiving a user selection signal, and the 2D driving mode or the 3D driving mode is determined according to the user selection signal received from the user interface.

15. The 2D/3D image display device of claim 14, wherein when the 2D image signal is received while the user selection is the 3D driving mode and the controller is unable to convert the 2D image signal to the 3D image data, the controller is adapted to generate the 2D image data using the 2D image signal, and the optical element layer is adapted to be driven in the 2D driving mode.

16. A 2 dimensional (2D)/3 dimensional (3D) image display device for displaying a 2D image or a 3D image on a display unit according to an input image signal,
  wherein the display unit comprises an optical element layer adapted to operate in one mode among a first driving mode and a second driving mode according to the input image signal, and
  a black screen is displayed for one frame between a frame of a 2D image signal and a frame of a 3D image signal and a driving mode of the optical element layer is converted to the first driving mode before the black screen is displayed, when the input image signal changes from the 2D image signal to the 3D image signal, and the black screen is displayed for one frame between the frame of the 3D image signal and the frame of the 2D image signal and the driving mode of the optical element layer is converted to the second driving mode when the input image signal changes from the 3D image signal to the 2D image signal.

17. The 2D/3D image display device of claim 16, wherein, when the input image signal changes from the 3D image signal to the 2D image signal, the black screen of one frame is displayed, and the driving mode of the optical element layer is converted to the second driving mode.

18. The 2D/3D image display device of claim 17, wherein the input image signal is displayed as the 2D image or the 3D image according to a user selection.

19. The 2D/3D image display device of claim 18, wherein if the user selects displaying the 3D image when the input image signal is the 2D image signal that cannot be converted to 3D image data, the optical element layer is driven in the second driving mode.

20. The 2D/3D image display device of claim 16, wherein, in the first driving mode, a left-eye image and a right-eye image are generated in response to the 3D image signal, and the optical element layer is used to respectively provide the left-eye image and the right-eye image to left and right eyes of a user.

21. A 2 dimensional (2D)/3 dimensional (3D) image display device for receiving an image signal and displaying a 2D image or a 3D image according to the image signal, the 2D/3D image display device comprising:
  a controller for detecting the image signal, determining whether the image signal is a 2D image signal or a 3D image signal, and determining a 2D driving mode or a 3D driving mode according to the image signal;
  a display panel comprising a plurality of pixels;
  an optical element layer for allowing an entire said 2D image to be transmitted in the 2D driving mode, and including an opaque region in the 3D driving mode;
  a light source for providing a backlight to the display panel;
  a light source controller for turning off the light source for a first period between a frame of the 2D image signal and a frame of the 3D image signal when the image signal changes from the 2D image signal to the 3D image signal, and turning off the light source for a second period between the frame of the 3D image signal and the frame of the 2D image signal when the image signal changes from the 3D image signal to the 2D image signal; and
  an optical element layer driver for converting a driving mode of the optical element layer to the 3D driving mode prior to the first period and converting the driving mode of the optical element layer to the 2D driving mode after the second period according to an operation of the controller.

22. The 2D/3D image display device of claim 21, wherein each of the first period and the second period has a duration of one frame.

23. A driving method of a 2 dimensional (2D)/3 dimensional (3D) image display device comprising a display unit for displaying a 2D image or a 3D image according to an image signal and an optical element layer having a first driving mode and a second driving mode according to the 3D image or the 2D image, the driving method comprising:
  a) detecting the image signal and determining whether the image signal is a 2D image signal or a 3D image signal;
  b) determining whether the image signal of a current frame and the image signal of a previous frame are respectively the 2D and 3D image signals or the 3D and 2D image signals;
  c) according to a result of b), when the image signal of the current frame and the image signal of the previous frame are respectively the 3D and 2D image signals, driving the optical element layer in the first driving mode after the 2D image signal of the previous frame is finished; and
  d) according to the result of b), when the image signal of the current frame and the image signal of the previous frame are respectively the 2D and 3D image signals, driving the optical element layer in the second driving mode right after the 2D image signal of the current frame is finished on the entire display unit.

24. The driving method of claim 23, wherein, in the first driving mode, a left-eye image and a right-eye image are generated in response to the 3D image signal, and the optical element layer is used to provide the left-eye image and the right-eye image to a left eye and a right eye, respectively.

25. The driving method of claim 24, wherein, in the second driving mode, an entire said 2D image displayed on the display unit is transmitted through the optical element layer in response to the 2D image signal.

26. The driving method of claim 23, further comprising selecting one mode among the first driving mode and the second driving mode.

27. The driving method of claim 26, wherein, when a user selects the first driving mode and the 2D/3D image display device is not configured to convert the 2D image signal to 3D image data, the optical element layer is maintained to be in the second driving mode.

28. A driving method of a 2 dimensional (2D)/3 dimensional (3D) image display device comprising an optical element layer for displaying a 2D or 3D image according to an image signal, wherein the optical element layer is driven in a first driving mode corresponding to a 3D image signal or in a second driving mode corresponding to a 2D image signal, the driving method comprising:
  a) detecting the image signal and determining whether the image signal is the 2D image signal or the 3D image signal;
  b) determining whether the image signal of a current frame and the image signal of a previous frame are respectively the 2D and 3D image signals or the 3D and 2D image signals; and
  c) according to a result of b), when the image signal of the current frame and the image signal of the previous frame are respectively the 3D and 2D image signals, converting a driving mode of the optical element layer to the first driving mode and then providing one frame of a black screen before the current frame.

29. The driving method of claim 28, further comprising d), according to the result of b), when the image signal of the current frame and the image signal of the previous frame are respectively the 2D and 3D image signals, providing the one frame of the black screen between the current frame and the previous frame.

30. The driving method of claim 29, wherein converting the driving mode of the optical element layer occurs after the one frame of the black screen is displayed on the 2D/3D image display device when the image signal of the current frame and the image signal of the previous frame are respectively the 2D and 3D image signals.

31. The driving method of claim 28, wherein the driving mode of the optical element layer starts to be converted between a time when the 2D image signal of one frame is displayed on the 2D/3D image display device according to the previous 2D image signal and a time when the one frame of the black screen is started.

32. A driving method of a 2 dimensional (2D)/3 dimensional (3D) image display device comprising an optical element layer having a first driving mode corresponding to a 3D image signal or a second driving mode corresponding to a 2D image signal, the 2D/3D image display device further comprising a display panel for displaying a 2D or 3D image according to an image signal and a light source for providing a backlight to the display panel, the method comprising:

a) detecting the image signal and determining whether the image signal is the 2D image signal or the 3D image signal;

b) determining whether the image signal of a current frame and the image signal of a previous frame are respectively the 2D and 3D image signals or the 3D and 2D image signals; and c) according to a result of b), when the image signal of the current frame and the image signal of the previous frame are respectively the 3D and 2D image signals, converting a driving mode of the optical element layer to the first driving mode and then turning off the light source for a first period between the current frame and the previous frame.

33. The driving method of claim 32, further comprising d), according to the result of b), turning off the light source for a second period between the current frame and the previous frame when the image signal of the current frame and the image signal of the previous frame are respectively the 2D image signal and the 3D image signal.

34. The driving method of claim 33, further comprising converting the driving mode of the optical element layer after the second period.

35. The driving method of claim 34, wherein each of the first and second periods has a duration of one frame.

* * * * *

UNITED STATES PATENT AND TRADEMARK OFFICE
CERTIFICATE OF CORRECTION

| | |
|---|---|
| PATENT NO. | : 8,487,917 B2 |
| APPLICATION NO. | : 11/736488 |
| DATED | : July 16, 2013 |
| INVENTOR(S) | : Seong-Cheol Han et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1352 days.

Signed and Sealed this

Thirteenth Day of January, 2015

Michelle K. Lee
*Deputy Director of the United States Patent and Trademark Office*